April 13, 1926.

A. N. NELSON ET AL 1,580,524

FISHING REEL ATTACHMENT

Filed Feb. 29, 1924

Inventors
AVERY N. NELSON
ROBERT L. MAPSON

By A. B. Bowman
Attorney

Patented Apr. 13, 1926.

1,580,524

UNITED STATES PATENT OFFICE.

AVERY N. NELSON AND ROBERT L. MAPSON, OF LOS ANGELES, CALIFORNIA.

FISHING-REEL ATTACHMENT.

Application filed February 29, 1924. Serial No. 695,906.

*To all whom it may concern:*

Be it known that we, AVERY N. NELSON and ROBERT L. MAPSON, citizens of the United States, residing at Los Angeles, in the county of Los Angeles and State of California, have invented a certain new and useful Fishing-Reel Attachment, of which the following is a specification.

Our invention relates to an attachment for fishing poles and reels for automatically taking up the backlash of the fish-line or preventing the unwinding of the line from the reel when casting with the pole and also to facilitate the even winding of the line on the reel, and the objects of our invention are: first, to provide an attachment of this class which may be secured to any fish-pole or used in connection with any reel for automatically preventing the reel from turning or the line from unwinding when the weight or bait at the end of the line strikes the water or ground when casting with the pole, thus automatically preventing the tangling of the line as is frequently the case with the conventional reel when the same is not stopped at the proper time; second, to provide an attachment for reels whereby the line may be wound evenly on the reel by manual manipulation of the attachment and whereby the line does not have to be handled with the finger; third, to provide a means in connection with reels which serves as a brake against the drum of the reel when the line is relatively loose and which brake is released from engagement with the drum of the reel when the line is taut, as when casting or when winding the line on the reel; fourth, to provide an attachment of this class for reels which is adjustable and may be easily and quickly secured to any pole and used in connection with most any reel; fifth, to provide as a whole a novelly constructed means of this class for reels, and sixth, to provide such a means which is very simple and economical of construction, durable, efficient, practical, which is easy to manipulate, and which will not readily deteriorate or get out of order.

Figure 1:
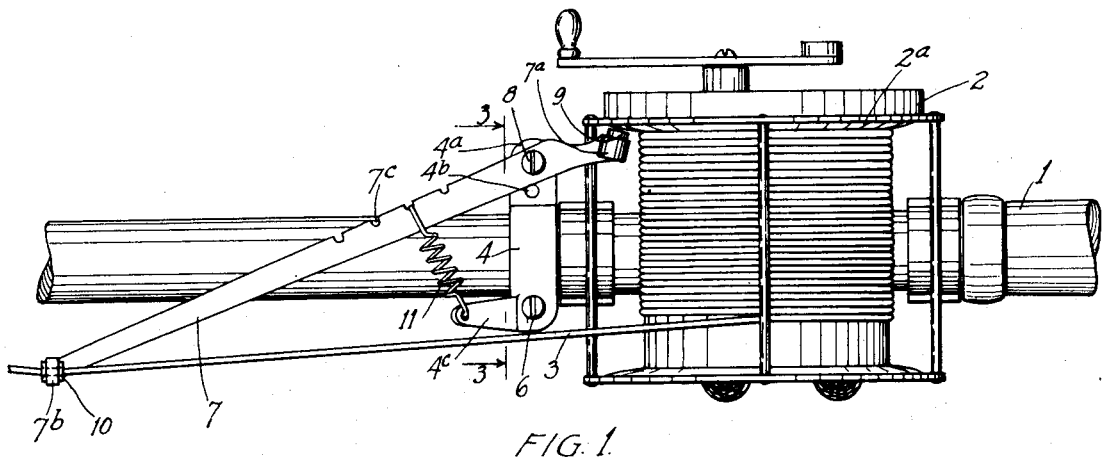
Figure 2:
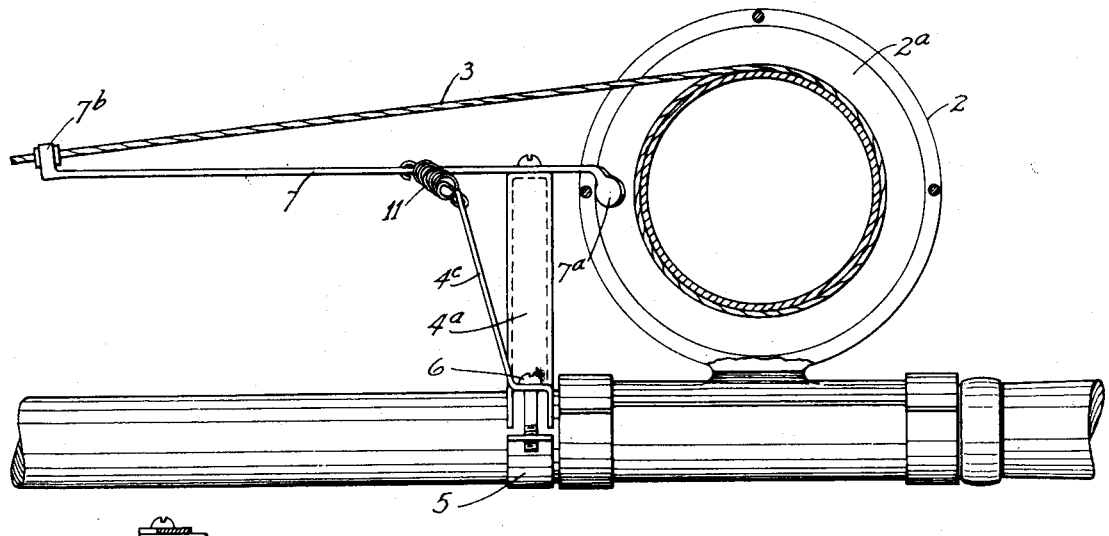
Figure 3:
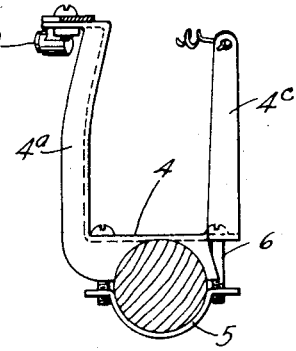

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of a fragmentary portion of a fishing rod with a reel secured thereto and our reel attachment used in connection with the same; Fig. 2 is a view taken at a right angle to that of Fig. 1 with portions of the reel broken away and in section to facilitate the illustration, and Fig. 3 is a transverse sectional view thereof taken through 3—3 of Fig. 1.

Like characters of reference refer to similar parts and portions throughout the several views of the drawings.

The pole 1, reel 2, line 3, support 4, clamp member 5, screws 6, lever 7, bolt 8, brake member 9, eyelet 10, and the tension spring 11, constitute the principal parts and portions of our structure as illustrated in the drawings.

The reel 2 may be of any suitable size or construction and secured to the pole 1 in any convenient manner. Our attachment for controlling reels is positioned forwardly from the reel 2 and is secured to the pole 1 by means of a support 4, engaging at its lower end the top side of said pole, and a clamp member 5 engaging the under side thereof, said support 4 and said clamp member 5 being secured together by means of screws 6, as shown best in Fig. 3 of the drawings. Said supporting member 4 is provided with an upwardly extending arm $4^a$, which is provided at its upper end with a flat portion on which is pivotally mounted intermediate its ends the lever 7 by means of a bolt 8. It will be noted that the upper, flat portion of the arm $4^a$ is provided with a plurality of holes $4^b$ so that the lever 7 may be mounted thereon in different positions in order to take care of reels of different widths. At the normally backwardly extending end of the lever 7 is provided a socket portion $7^a$ in which is mounted a brake member 9, preferably of cork, which is adapted to engage the inner side of the drum $2^a$ of the reel 2 when the line 3 is loose. At the normally forwardly extending end $7^b$ of the lever 7 is mounted an eyelet 10, preferably of agate, through which the line 3 is threaded from the reel to the end of the pole or eyelet members intermediate the ends of the same. Intermediate the pivotal mounting of the lever 7 and the forwardly extending end thereof are provided a plurality of notches $7^c$, which are adapted to retain the one end of the tension spring 11, which spring is secured at its opposite end in another upwardly and forwardly extending arm 4ᶜ of the support 4, said arm being positioned on the opposite side of said support from the arm 4ᵃ. The plurality of notches 7ᶜ in the lever 7 are provided to vary the tension of the spring 11 or to provide the proper tension when the attachment is fitted to function with reels of different widths.

It will be noted that when casting with the pole the tension on the line 3, due to the weight or bait at the end of the line, tends to straighten the line from the reel to its nearest eyelet, thus rotating the lever 7 about its pivotal mounting and disengaging the brake end thereof from the drum of the reel 2. Also when desiring to wind the line on the reel the lever 7 is shifted by means of the thumb of the left hand gainst the tension of the spring, and is also released by the thumb, thus providing efficient means for winding the line on the drum of the reel.

It is obvious from this construction, as illustrated in the drawings and disclosed in the foregoing specification, that there is provided an attachment for reels as aimed at and set forth in the objects of the invention, and though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent, is:

1. In a reel attachment, the combination with a fishing reel of a lever pivotally mounted intermediate its ends at the front portion of said reel and provided at its one end with a brake means adapted to engage the drum of said reel and provided at its opposite end with a guide means for the line of said reel, and a tension means connected with said lever intermediate its pivotal mounting and the end provided with said guide means adapted to retain said brake means in engagement with the drum of said reel.

2. In a brake means for fishing reels, the combination with a pole and a reel mounted thereon, of a support secured to said pole in front of said reel, and a brake lever pivotally mounted intermediate its ends on said support and provided at its backwardly extending end with a brake member adapted to engage a revolving portion of said reel and provided at its opposite end with a guide means through which the line of said reel is adapted to pass.

3. In a brake means for fishing reels, the combination with a pole and a reel mounted thereon, of a support secured to said pole in front of said reel, a brake lever pivotally mounted intermediate its ends on said support and provided at its backwardly extending end with a brake member adapted to engage a revolving portion of said reel and provided at its opposite end with a guide means through which the line of said reel is adapted to pass, and a tension spring connected at its one end to said support and at its opposite end intermediate the pivotal mounting of said lever and the forwardly extending ends thereof.

In testimony whereof, we have hereunto set our hands at Los Angeles, California, this 20th day of February, 1924.

AVERY N. NELSON.
ROBERT L. MAPSON.